United States Patent [19]
Bishop et al.

[11] Patent Number: 4,987,289
[45] Date of Patent: Jan. 22, 1991

[54] LIQUID CRYSTAL DISPLAY HEATING SYSTEM

[75] Inventors: Gary D. Bishop; Melvin L. Campbell, both of Marion; James E. Shaw, Cedar Rapids, all of Iowa

[73] Assignee: Rockwell International Corporation, El Segundo, Calif.

[21] Appl. No.: 223,204

[22] Filed: Jul. 21, 1988

[51] Int. Cl.$^5$ .............................. G02F 1/13; H05B 1/00
[52] U.S. Cl. ................................. 219/209; 350/331 T
[58] Field of Search ............... 219/209, 210, 528, 541, 219/543, 549; 350/351, 331 T

[56] References Cited

U.S. PATENT DOCUMENTS

| | | | |
|---|---|---|---|
| 3,577,137 | 5/1971 | Brennan | 340/324 |
| 3,698,012 | 10/1972 | Ensminger et al. | 340/324 X |
| 3,725,898 | 4/1973 | Canton | 340/324 X |
| 3,829,653 | 8/1974 | Ensminger et al. | 219/216 |
| 4,177,446 | 12/1979 | Diaz | 219/549 |
| 4,298,786 | 11/1981 | Marciniec | 219/543 |
| 4,500,878 | 2/1985 | Hareng et al. | 340/713 |
| 4,621,261 | 11/1986 | Hehlen et al. | 340/825 |
| 4,633,068 | 12/1986 | Grise | 219/543 |
| 4,723,835 | 2/1988 | Franklin | 350/331 R |
| 4,773,735 | 9/1988 | Ukvainksky et al. | 350/351 |
| 4,775,221 | 10/1988 | Baumgartner, Jr. | 350/351 |

FOREIGN PATENT DOCUMENTS

| | | | |
|---|---|---|---|
| 221726 | 11/1985 | Japan | 350/331 T |
| 399086 | 2/1974 | U.S.S.R. | 219/209 |

Primary Examiner—Geoffrey S. Evans
Attorney, Agent, or Firm—John C. McFarren; John J. Horn; H. Frederick Hamann

[57] ABSTRACT

A non-uniform heating system is provided for liquid crystal displays. The system includes structure for applying a greater concentration of heat to the periphery of LCDs. Because mounting structures produce large heat sinks around the edges of LCDs, providing greater heat to the edges results in a more uniform distribution of heat across the LCDs. In another aspect of the heating system, rapid warming may be provided for preselected critical areas of a display to reduce warm-up time, reduce power consumption, and provide mission critical displays in situations such as scrambles of military aircraft on cold weather alert.

7 Claims, 1 Drawing Sheet

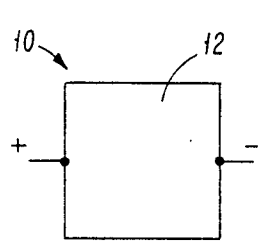
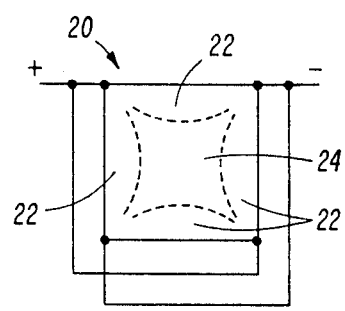
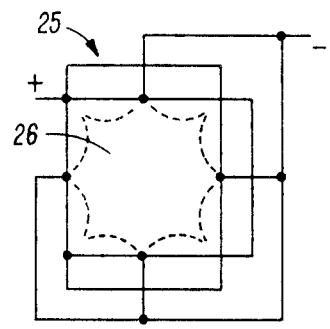
FIG. 1   FIG. 2a   FIG. 2b
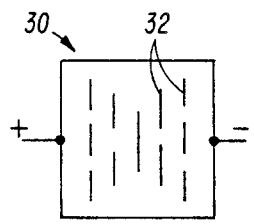
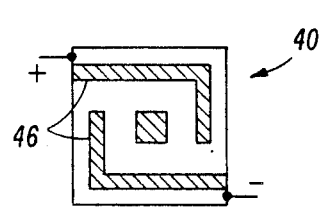
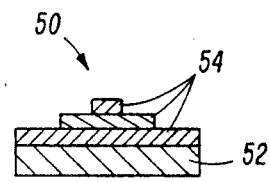
FIG. 3   FIG. 4   FIG. 5
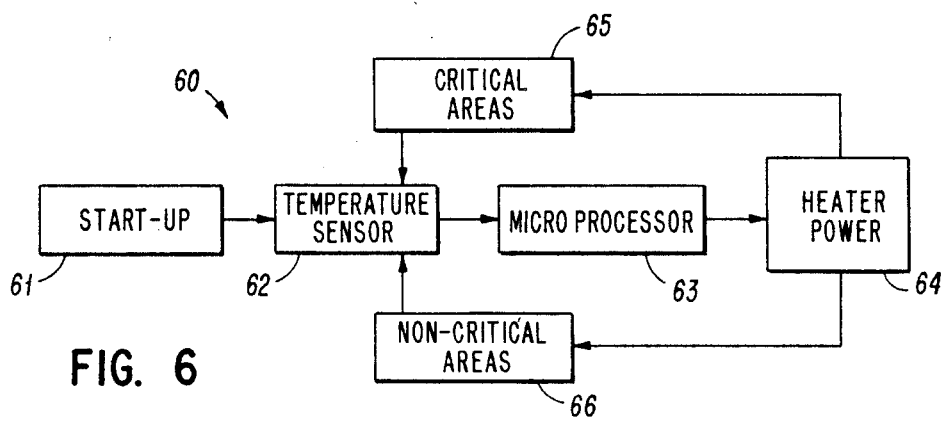
FIG. 6
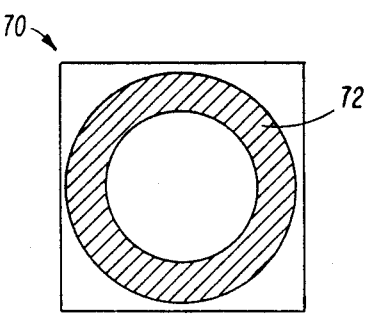
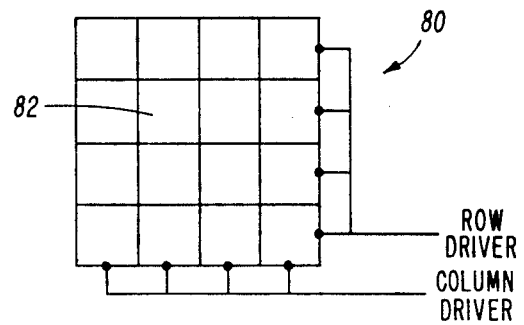
FIG. 7   FIG. 8

LIQUID CRYSTAL DISPLAY HEATING SYSTEM

TECHNICAL FIELD

The present invention relates to liquid crystal displays (LCDs) and, in particular, to a non-uniform heating system for LCDs.

BACKGROUND OF THE INVENTION

Liquid crystal displays (LCDs) do not operate well at low temperatures. At temperatures of approximately −20 degrees C. and below, the LCD fluid becomes too viscous to respond to an applied electric potential within a specified time. Because it is the fluid in the LCD and not the remainder of the device that must be heated during low temperature operation, LCDs can be procured with integral heater elements. Although most LCD materials can be utilized in a static mode between temperatures of −20 to −40 degrees C., the application of heater power is necessary for operation of dynamic areas of the display at these low temperatures.

An integral heater element for an LCD generally comprises a thin film of transparent indium tin oxide (ITO) deposited on the LCD. By maintaining an electric potential connected to one edge of the ITO heater and switchably connecting the opposite side of the heater to ground, the LCD can be selectively heated during cold temperature operation. However, applying a potential across a uniform coating of ITO on the LCD results in a thermal gradient. Because the LCD is mounted in a support structure, the edges of the heated LCD can remain much cooler than the center of the display because the mounting structure acts as a heat sink. Thus, the center portion of the LCD can be overheated while the edges remain too cold.

LCD heating systems also tend to consume a lot of power while requiring lengthy warm-up periods. Some cold weather LCD operating situations, such as a scramble of military aircraft on cold weather alert, require rapid LCD warm-up without excessive use of power. Thus, there is a need for an LCD heating system that reduces warm-up time, reduces power consumption, and provides a more uniform temperature gradient across the entire display during cold weather operation.

SUMMARY OF THE INVENTION

The present invention comprises a heating system that provides non-uniform heating for liquid crystal displays (LCDs) during low temperature operations. Because the mounting structure for an LCD acts as a heat sink around the edges of the LCD, the present invention provides a higher concentration of heat at the edges of the LCD to obtain a more uniform distribution of heat across the entire LCD.

The present invention utilizes structure to provide a non-uniform application of heat across an LCD in order to provide a more uniform temperature. In one embodiment, a uniform coating of indium tin oxide (ITO) is deposited on the glass of the display. Electrical leads are connected to the ITO at a plurality of locations around the display. The edge connections are placed so that an electric potential causes greater heating of the ITO around the edges of the display than in the center portion of the display. In a second embodiment, the ITO layer is provided with a plurality of slits to control the current flow from one edge of the LCD to an opposite edge, thereby controlling the temperature gradient across the LCD. In a third embodiment of the present invention, nested spirals of ITO can be deposited on the glass of the display to provide greater heat around the edges of the display and less heat at the center of the display. In a fourth embodiment, a plurality of layers of ITO having different geometries can be deposited on the glass of the display to provide the non-uniform heating as required to compensate for the heat sink around the edges of the display.

In another aspect of the LCD heating system of the present invention, circuitry is provided for rapid heating of preselected critical areas of a display in situations such as scrambles of military aircraft on cold weather alert. Heating of preselected areas of a display reduces warm-up time, reduces power consumption, and provides for operation of critical portions of the display while the remaining areas are heated at the normal rate.

BRIEF DESCRIPTION OF THE DRAWINGS

For a more complete understanding of the invention and for further advantages thereof, reference is made to the following Description of the Preferred Embodiments taken in conjunction with the accompanying Drawings, in which:

FIG. 1 illustrates a prior art liquid crystal display (LCD) that provides a uniform application of heat across the LCD;

FIGS. 2a and 2b disclose LCDs having electrical connections placed to produce a non-uniform distribution of heat across the LCDs;

FIG. 3 illustrates an LCD having slits in the ITO layer to produce a non-uniform distribution of heat;

FIG. 4 illustrates nested spirals of ITO deposited on the LCD to produce a non-uniform distribution of heat;

FIG. 5 is a cross-section of an LCD showing a plurality of different layers of ITO to produce a non-uniform distribution of heat;

FIG. 6 is a block diagram of a heating system of the present invention that provides rapid heating of critical areas of an LCD;

FIG. 7 illustrates heating of a critical area of a dedicated display panel; and

FIG. 8 illustrates heating of selected areas of a grid on a multifunction display panel.

DESCRIPTION OF THE PREFERRED EMBODIMENTS

FIG. 1 illustrates a liquid crystal display (LCD) 10 having electrical connectors for heating the display. LCD 10 typically comprises a multiplicity of liquid crystal elements (not shown) that make up the entire display. As is known in the prior art, a glass panel of LCD 10 may be coated with a thin film of a transparent conductor such as indium tin oxide (ITO) 12. When an electric potential is applied to the terminals of LCD 10, ITO layer 12 produces a generally uniform heating pattern across the entire display. However, LCD 10 is typically mounted in a structure (not shown) that provides a heat sink around the edges of LCD 10. Therefore, the uniform application of heat across LCD 10 produces greater heat at the center of the display and less heat around the edges of the display that are in contact with the heat sink.

The present invention includes structure that produces a non-uniform application of heat across an LCD. FIGS. 2a and 2b illustrate typical LCDs 20 and 25, respectively, that include a uniform coating of ITO as described above in conjunction with LCD 10 of FIG. 1.

In LCD 20, a positive electrical connector is attached to two opposite corners of square LCD 20. A negative electrical connector is attached to the two remaining corners of LCD 20. When an electric potential is applied to the connectors, a temperature gradient is produced across LCD 20 as indicated by the dotted lines. As a result of the current flow in the ITO layer, an area 22 around the edge of LCD 20 receives a greater distribution of heat than an area 24 at the center of LCD 20 that receives a lesser distribution of heat. The greater distribution of heat in area 22 compensates for the cooling effect of the heat sink provided by the mounting structure around the edge of LCD 20. As shown in FIG. 2b, the electrical connectors can be attached to the ITO of LCD 25 at various places to adjust the distribution of heat. In LCD 25, the positive connector is attached to the four corners of square LCD 25, and the negative connector is attached at the midpoint of each side of LCD 25. This arrangement of electrical connectors produces an area 26 of lesser heat distribution inside the dotted lines of FIG. 2b.

FIG. 3 illustrates another embodiment of the present invention that produces a non-uniform distribution of heat across LCD 30. The coating of ITO on LCD 30 is provided with a plurality of discontinuities or slits 32 that function to direct the flow of current around the edges of LCD 30 when an electric potential is applied to opposite edges of the ITO of LCD 30.

FIG. 4 illustrates an embodiment of the present invention wherein the ITO layer is deposited on LCD 40 in a pattern resembling nested spirals. The ITO pattern on LCD 40 directs the flow of current around the edges of LCD 40 with less heating provided in the center of LCD 40 and in the areas 46 not coated with ITO.

FIG. 5 is a cross section of an LCD 50 illustrating another embodiment of the present invention. In LCD 50, a plurality of different layers of ITO 54 are deposited on glass plate 52. The layers of ITO 54 are deposited in a pattern to produce a greater distribution of heat around the edges of LCD 50 as explained above in the previous embodiments of the present invention.

In some situations, such as military aircraft stationed on cold weather alert, it is necessary to have a fast warm-up capability for LCDs. However, in these situations it may be necessary to provide rapid warming of only the areas of the display that are critical during the first few minutes of operation. Therefore, to provide rapid warm-up of critical areas of a display without excessive power consumption, the LCD heating system of the present invention provides rapid heating of critical areas of the display followed by normal heating of the entire display. A block diagram of the heating system of the present invention is illustrated in FIG. 6.

Referring to FIG. 6, initiation of the LCD start-up sequence 61 causes a temperature sensor 62 to provide an input to a power management microprocessor 63. Microprocessor 63 controls the distribution of heater power 64. If temperature sensor 62 indicates the need for LCD heating, microprocessor 63 directs heater power 64 to provide heating of critical areas 65 of the LCD. When critical areas 65 have reached the specified temperature as detected by sensor 62, microprocessor 63 directs heater power 64 to provide heating to non-critical areas 66 of the LCD. If the LCD is a multifunction display unit, microprocessor 63 may also receive input from a mode selector switch to determine the critical areas of the LCD based on the selected mode. The primary advantages of heating system 60 are the reduction of warm-up time for critical areas of the LCD and the overall reduction of power consumption in heating the LCD.

FIG. 7 illustrates an approximately 3.2 inch square LCD panel 70 dedicated to the display of an aircraft HSI. The portion of the HSI that would be considered critical for display during an aircraft scramble is found within a ring 72 of the LCD 70. By supplying power only to ring 72 rather than the entire display for a one minute warm-up time, an approximately 70% power saving is realized. After the one minute warm-up for ring 72, the remainder of LCD 70 can be heated by another set of low power, long-term heater surfaces. Alternatively, the remainder of LCD 70 can be heated merely by the power dissipation of a back lighting system.

FIG. 8 illustrates a grid heater pattern for LCD 80. As an alternative to the fast warm-up, fixed heater geometry of LCD 70, a multifunction display may require a selectable heater grid pattern as illustrated in FIG. 8. Based on the mode selected by the operator, the row and column heater drivers of LCD 80 provide power to heat selected areas of the grid, such as segment 82, for rapid warm-up during cold weather. By providing power to selected segments of the grid, rapid warm-up of critical areas of LCD 80 is accomplished without the expenditure of excessive power to heat the entire display.

Although the present invention has been described with respect to specific embodiments thereof, various changes and modifications may be suggested to one skilled in the art, and it is intended that the present invention encompass such changes and modifications as fall within the scope of the appended claims.

We claim:

1. A heater for a liquid crystal display (LCD), comprising:
   a thin film conductor applied to an LCD;
   power supply means connected to said LCD for providing an electrical potential across said thin film conductor; and
   a plurality of electrical connectors attached to said thin film conductor at its corner edges for directing electrical current through said thin film conductor so as to provide greater heating near the edges of the LCD.

2. A heater for a liquid crystal display (LCD), comprising:
   a thin film conductor applied to an LCD;
   power supply means connected to said LCD for providing an electrical potential across said thin film conductor; and
   a plurality of discontinuities in said thin film conductor for directing electrical current through said thin film conductor so as to provide greater heating near the edges of the LCD.

3. A heater for a liquid crystal display (LCD), comprising:
   a thin film conductor applied to an LCD;
   power supply means connected to said LCD for providing an electrical potential across said thin film conductor;
   means for directing electrical current through said thin film conductor so as to provide greater heating near the edges of the LCD; and
   means for providing heat to preselected critical areas of the LCD for rapid warm-up of said critical areas during start-up of the LCD.

4. A system for providing non-uniform heating of a liquid crystal display (LCD), comprising:
   a thin film conductor applied to an LCD;
   power supply means coupled to said LCD for providing an electrical potential across the thin film conductor; and
   means for directing electrical power to preselected critical areas of the LCD for rapid warm-up of said critical areas during start-up of the LCD.

5. The LCD heating system of claim 4, wherein said power directing means comprises a fixed geometry for said thin film conductor.

6. The LCD heating system of claim 4, wherein said electrical power directing means comprises a plurality of electrical connectors attached to the thin film conductor at the edges corner of the LCD.

7. The LCD heating system of claim 4, further comprising:
   a sensor for sensing the temperature of said critical areas; and
   said power directing means comprising a microprocessor that receives an input from said sensor.

* * * * *